United States Patent
Robert Jose et al.

(10) Patent No.: US 12,482,472 B2
(45) Date of Patent: Nov. 25, 2025

(54) SYSTEMS AND METHODS FOR DETECTING A MIMICKED VOICE INPUT SIGNAL (71) Applicant: Adeia Guides Inc., San Jose, CA (US)

(72) Inventors: Jeffry Copps Robert Jose, Tamil Nadu (IN); Sindhuja Chonat Sri, Tamil Nadu (IN); Mithun Umesh, Bangalore (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 17/095,338

(22) Filed: Nov. 11, 2020

(65) Prior Publication Data

US 2022/0148600 A1 May 12, 2022

(51) Int. Cl.
G10L 17/08 (2013.01)
G10L 17/04 (2013.01)
G10L 17/18 (2013.01)
G10L 17/22 (2013.01)
G10L 25/51 (2013.01)

(52) U.S. Cl.
CPC .............. G10L 17/08 (2013.01); G10L 17/04 (2013.01); G10L 17/18 (2013.01); G10L 17/22 (2013.01); G10L 25/51 (2013.01)

(58) Field of Classification Search
CPC ......... G10L 17/22; G10L 15/22; G10L 17/04; G10L 17/08; G10L 17/18; G10L 25/51
USPC ........................................................ 704/246
See application file for complete search history.

(56) References Cited

U.S. PATENT DOCUMENTS

| | | | | |
|---|---|---|---|---|
| 7,487,094 B1 * | 2/2009 | Konig | ...................... | G10L 15/19 379/88.04 |
| 11,798,564 B2 * | 10/2023 | Wang | ...................... | G10L 17/26 |
| 2007/0198257 A1 * | 8/2007 | Zhang | ...................... | G10L 17/20 704/E17.008 |
| 2014/0201126 A1 * | 7/2014 | Zadeh | ...................... | A61B 5/165 706/52 |
| 2015/0127342 A1 * | 5/2015 | Sharifi | ...................... | G10L 17/18 704/239 |

(Continued)

FOREIGN PATENT DOCUMENTS

EP 3599606 A1 1/2020

OTHER PUBLICATIONS

Ye Jia et al. 2018. Transfer learning from speaker verification to multispeaker text-to-speech synthesis. In Proceedings of the 32nd International Conference on Neural. (Year: 2018).*

(Continued)

*Primary Examiner* — Richemond Dorvil
*Assistant Examiner* — Rodrigo A Chavez
(74) *Attorney, Agent, or Firm* — HALEY GUILIANO LLP (57) ABSTRACT Methods and systems are disclosed herein for training a network to detect mimicked voice input, so that it can be determined whether a voice input signal is a mimicked voice signal. First voice data is received. The first voice data comprises at least a voice signal of a first individual and another voice signal. The voice signal of the first individual and at least one other voice signal is combined to create a composite voice signal. Second voice data is received. The second voice data comprises at least a voice signal of the first individual. The network is trained using at least the composite voice signal and the second voice data to determine whether a voice input signal is a mimicked voice input signal.

20 Claims, 4 Drawing Sheets

(56) References Cited

U.S. PATENT DOCUMENTS

| | | | |
|---|---|---|---|
| 2016/0240188 A1* | 8/2016 | Seto | G10L 15/32 |
| 2017/0263257 A1* | 9/2017 | Tsujikawa | G10L 17/02 |
| 2018/0254046 A1* | 9/2018 | Khoury | G10L 25/24 |
| 2019/0304480 A1 | 10/2019 | Narayanan et al. | |
| 2019/0318722 A1 | 10/2019 | Bromand | |
| 2020/0043471 A1* | 2/2020 | Ma | G10L 15/07 |
| 2020/0228648 A1* | 7/2020 | Wang | H04M 3/42059 |
| 2020/0322377 A1* | 10/2020 | Lakhdhar | G10L 17/04 |
| 2020/0349953 A1* | 11/2020 | Qin | G10L 15/26 |
| 2021/0126929 A1* | 4/2021 | Ur | H04L 63/08 |
| 2021/0193174 A1* | 6/2021 | Enzinger | G10L 17/00 |
| 2021/0233541 A1* | 7/2021 | Chen | G10L 17/02 |
| 2021/0256978 A1* | 8/2021 | Jin | G10L 15/063 |
| 2021/0279427 A1* | 9/2021 | Malik | G10L 25/51 |
| 2022/0076674 A1* | 3/2022 | Wu | G10L 15/08 |
| 2022/0121884 A1* | 4/2022 | Zadeh | G06N 3/006 |
| 2022/0148589 A1* | 5/2022 | Kim | A61B 5/165 |
| 2022/0148600 A1* | 5/2022 | Robert Jose | G06N 3/08 |
| 2022/0182485 A1* | 6/2022 | Frenkel | H04M 3/2281 |

OTHER PUBLICATIONS

Yang Gao, Rita Singh, and Bhiksha Raj. 2018. Voice Impersonation Using Generative Adversarial Networks. In 2018 IEEE International Conference on Acoustics, Speech and Signal Processing (ICASSP). IEEE Press, 2506-2510. (Year: 2018).*

Rao, K. S. Sekhara. "Voice conversion by mapping the speaker-specific features using pitch synchronous approach." Comput. Speech Lang. 24 (2010): 474-494. (Year: 2010).*

Dora M. Ballesteros, Yohanna Rodriguez-Ortega, Diego Renza, and Gonzalo Arce. 2021. Deep4SNet: deep learning for fake speech classification. Expert Syst. Appl. 184, C (Dec. 2021). (Year: 2021).*

Y. Gao, R. Singh and B. Raj, "Voice Impersonation Using Generative Adversarial Networks," 2018 IEEE International Conference on Acoustics, Speech and Signal Processing (ICASSP), Calgary, AB, Canada, 2018, pp. 2506-2510 (Year: 2018).*

Deng, J., Chen, Y., Zhong, Y., Miao, Q., Gong, X., University, W.X., & University, W. (2023). Catch You and I Can: Revealing Source Voiceprint Against Voice Conversion. (Year: 2023).*

Hanilçi, C., Kinnunen, T., Sahidullah, M., Sizov, A. (2015) Classifiers for synthetic speech detection: a comparison. Proc. Interspeech 2015, 2057-2061, doi: 10.21437/Interspeech.2015-466 (Year: 2015).*

Neelima, "Mimicry Voice Detection using Convolutional Neural Networks," Proceedings of the International Conference on Smart Electronics and Communications, IEEE Xplore Part No. CFP20V90-ART:ISBN:978-1-7281-5461-9 (2020) (5 pages).

PCT International Search Report for International Application No. PCT/US2020/067385, dated Aug. 12, 2021 (21 pages).

* cited by examiner

SYSTEMS AND METHODS FOR DETECTING A MIMICKED VOICE INPUT SIGNAL

BACKGROUND

The disclosure relates to detecting a mimicked voice input signal and, in particular, but not exclusively, systems and related methods for training a neural network to predict when one member of a household is mimicking the voice of another member of the household.

SUMMARY

With the proliferation of computing devices, such as laptops, smartphones, tablets, and smart speakers, there has been an increase in the use of systems that allow users to interact with such computing devices via natural language inputs. For example, if a user wanted to use a computing device to play a movie starring Tom Cruise, the user may interact with the computing device by providing the command "Play a Tom Cruise movie." In some environments the computing device may be user equipment, such as a set-top box for providing over-the-top media services, that is accessible by multiple members of the same household, such that parents and children can access their favorite content as they wish. However, few voice-activated systems feature parental control that helps parents restrict the content that can be accessed by their children.

In voice-activated systems, a user profile may be associated with a particular person's voice, such that content can be restricted depending on the settings for the user profile. However, such systems may be unable to account for vocal impersonation, e.g., when a child is mimicking their parent's voice, which compromises parental control imposed by user profile settings.

Methods and systems are disclosed herein for training a network to detect mimicked voice input, so that it can be determined whether a voice input signal is a mimicked voice signal.

In accordance with a first aspect of the disclosure, a method is provided for training a network to detect mimicked voice input. The method comprises receiving first voice data. The first voice data comprises at least a voice signal of a first individual and another voice signal, e.g., a voice signal of a second individual. The first voice data may comprise reference voice data, e.g., one or more reference voice signals. The first voice data may comprise voice data from a first set of individuals. The first set of individuals may comprise individuals from the same household. The method comprises combining the voice signal of the first individual and at least one other voice signal, e.g., the voice signal of the second individual and/or the reference voice signal, to create a composite voice signal. The method comprises receiving second voice data. The second voice data comprises at least a voice signal of the first individual, e.g., another voice signal of the first individual. The second voice data may comprise a voice signal of the second individual. The second voice data may comprise voice data from the first set of individuals. The second voice data may comprise voice data from a second set of individuals. The second set of individuals may comprise individuals from another household, e.g., a household different to the household of the first set of individuals. The first voice data and the second voice data may comprise at least one common voice signal. The method comprises training the network using at least the composite voice signal and the second voice data to determine whether a voice input signal, e.g., a voice input signal from anyone other than the first individual, is a mimicked voice input signal.

In some examples, the first individual and the second individual may be from a first household. In some examples, the first individual may be from a first household and the second individual may be from a second household different to the first household.

In some examples, the method may comprise diarizing the first voice data. For example, the method may comprise separating each voice signal in the first voice data into its constituent components, e.g., words and/or phrases. In some examples, the method may comprise matching like words and/or phrases. For example, the method may comprise, following the diarization of the first voice data, matching a word/phrase of the first voice signal with a like word/phrase of the second voice signal. In some examples, the method may comprise computing the cartesian product of the voice signals of the first voice data. For example, the method may comprise matching a word/phrase of the first voice signal with a first like word/phrase of the second voice signal and also with a second like word/phrase of the second voice signal. For example, the first voice signal may comprise the word "the", and the second voice signal may comprise multiple instances of the word "the". In such a case, the instance of the word "the" in the first voice signal may be matched with each instance of the word "the" in the second voice signal, e.g., to form three matched pairs of words.

In some example, the method may comprise adjusting the tempo of at least one of the voice signal of the first individual and the voice signal of the second individual. For example, matching a word/phrase of the first voice signal with a like word/phrase of the second voice signal may comprise adjusting the tempo of at least one of the first and second voice signals. Tempo matching may be performed to ensure that each of the words/phrases in a matched pair have the same duration. In some example, matching like words and/or phrases may comprise performing a phase shift operation on at least one of the first and second voice signals, e.g., so that like words/phrases have the at least one of the same start point and the same end point.

In some examples, combining the voice signal of the first individual and the voice signal of the second individual may comprise a superimposition operation. For example, the method may comprise adding or subtracting at least a portion of the voice signal of the first individual to or from the voice signal of the second individual.

In some examples, the method may comprise diarizing the second voice data. The second voice data may be diarized in a manner similar to the above described diarization of the first voice data. The second voice data may be diarized so that it can be compared and contrasted with one or more composite voice signals.

In accordance with a second aspect of the disclosure, a system is provided for training a network to detect mimicked voice input. The system comprises control circuitry configured to receive first voice data. The first voice data comprises a voice signal of a first individual and another voice signal, e.g., a voice signal of a second individual. The control circuitry is configured to combine the voice signal of the first individual and the other voice signal to create a composite voice signal. The control circuitry is configured to receive second voice data. The second voice data comprises at least a voice signal of the first individual, e.g., another voice signal of the first individual. The second voice data may comprise a voice signal of the second individual. The control circuitry is configured to train the network using the composite voice signal and the second voice data to determine whether a voice input signal is a mimicked voice input signal.

In accordance with a third aspect of the disclosure, a non-transitory computer-readable medium is provided having instructions encoded thereon that when executed by control circuitry cause the control circuitry to train a network to detect a mimicked voice input signal.

In accordance with a fourth aspect of the disclosure, a method is provided for determining whether a voice input signal is a mimicked voice input signal. The method comprises receiving, e.g., at a model comprising at least one neural network, the voice input signal. The method may comprise diarizing the voice input signal. The method comprises outputting an indication of whether the input voice signal is mimicked. For example, where the model determines that the probability that the input voice signal is a mimicked input voice signal, the method may comprise restricting, e.g., automatically, one or more functions of user equipment. Where the model determines that the probability that the input voice signal is not a mimicked input voice signal, the method may comprise outputting, e.g., automatically, the input voice signal for further processing.

In some examples, the model may have been trained by receiving first voice data. The first voice data comprises at least a voice signal of a first individual. The first voice data may comprise a voice signal of a second individual. The first voice data may comprise reference voice data. The first voice data may comprise voice data from a first set of individuals. The first set of individuals may comprise individuals from the same household. The model may have been trained by combining the voice signal of the first individual and at least one other voice signal, e.g., the voice signal of the second individual and/or the reference voice signal, to create a composite voice signal. The model may have been trained by receiving second voice data. The second voice data comprises at least a voice signal of the first individual, e.g., another voice signal of the first individual. The second voice data may comprise a voice signal of the second individual. The second voice data may comprise voice data from the first set of individuals. The second voice data may comprise voice data from a second set of individuals. The second set of individuals may comprise individuals from another household, e.g., a household different to the household of the first set of individuals. The first voice data and the second voice data may comprise at least one common voice signal. The model may have been trained using at least the composite voice signal and the second voice data to determine whether a voice input signal, e.g., a voice input signal from anyone other than the first individual, is a mimicked voice input signal.

In accordance with a fifth aspect of the disclosure, a system is provided for determining whether a voice input signal is a mimicked voice signal. The system comprises control circuitry configured to receive, at a model comprising at least one neural network, the voice input signal. The control circuitry is configured to output an indication of whether the input voice signal is mimicked. In some examples, the model was trained by the control circuitry, or other control circuitry, configured to: receive first voice data comprising at least a voice signal of a first individual and a voice signal of a second individual; combine the voice signal of the first individual and the voice signal of the second individual to create a composite voice signal; receive second voice data comprising at least another voice signal of the first individual; and train the network using the composite voice signal and the second voice data to determine whether a voice input signal is a mimicked voice input signal.

In accordance with a sixth aspect of the disclosure, a non-transitory computer-readable medium is provided having instructions encoded thereon that when executed by control circuitry cause the control circuitry to receive, at a model comprising at least one neural network, the voice input signal; and output an indication of whether the input voice signal is mimicked. To train the model, execution of the instructions causes the control circuitry, or other control circuitry, to: receive first voice data comprising at least a voice signal of a first individual and a voice signal of a second individual; combine the voice signal of the first individual and the voice signal of the second individual to create a composite voice signal; receive second voice data comprising at least another voice signal of the first individual; and train the network using the composite voice signal and the second voice data to determine whether a voice input signal is a mimicked voice input signal.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout and in which.

DETAILED DESCRIPTION

Figure 1:
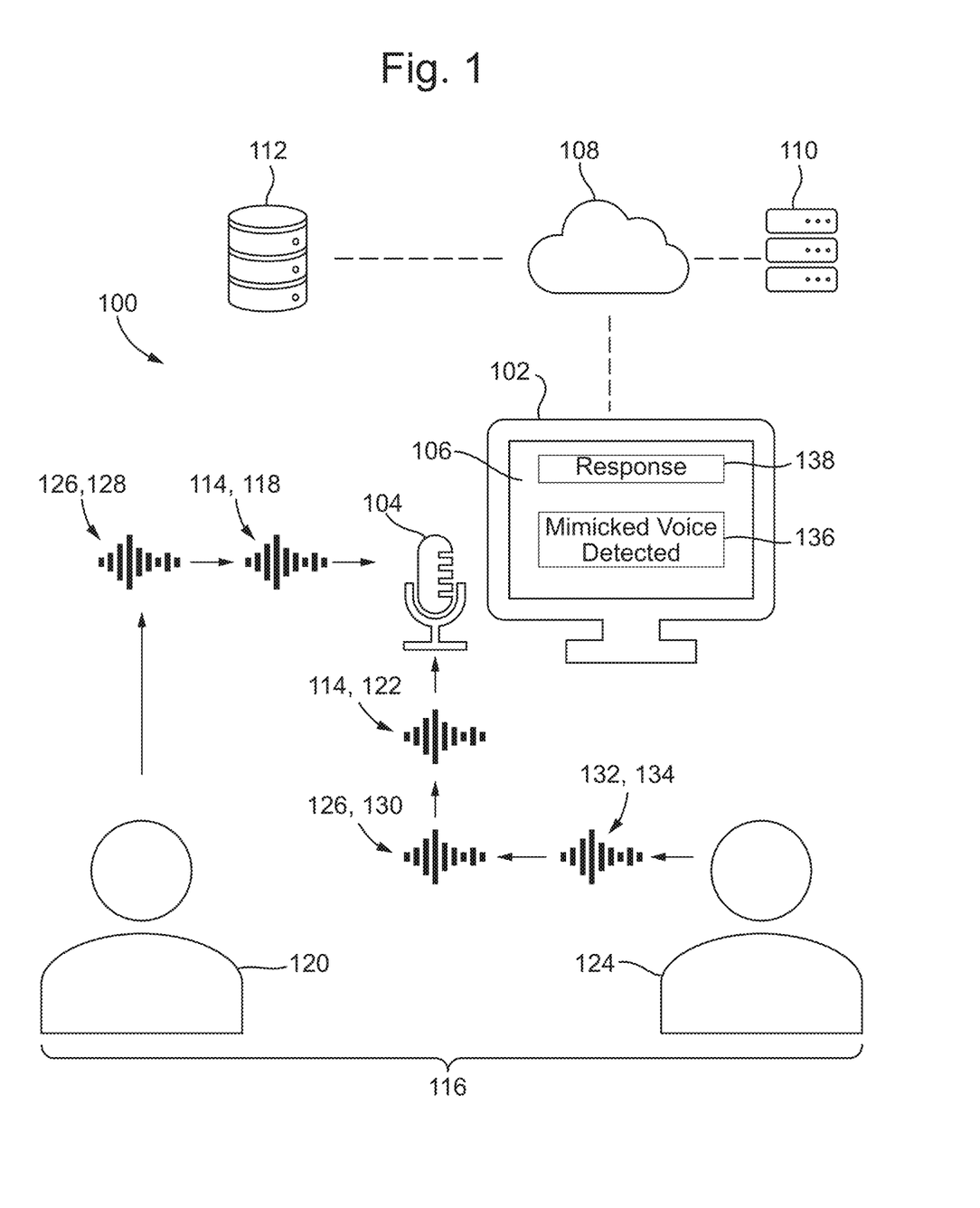
FIG. 1 shows an exemplary system in which multiple users interact with voice-activated user equipment, in accordance with some examples of the disclosure.

FIG. 1 illustrates an overview of a system 100 configured to train a neural network to detect mimicked voice input and/or to determine whether a voice input signal is a mimicked voice input signal, in accordance with some examples of the disclosure. In some examples, system 100 includes a device 102, such as a tablet computer, a smartphone, a smart television, a smart speaker, a home assistant, or the like, that has one or more various user interfaces configured to interact with one or more nearby users. In some examples, the device 102 may have a voice-user interface 104, which is configured to receive a natural language input, e.g., a voice input, as it is uttered by a nearby user. In some examples, device 102 has an audio driver, such as a speaker (not shown), configured to audibly provide information, such as query responses/results, to one or more users. Additionally or alternatively, device 102 may have a display 106, which is configured to display information and/or content via a graphical user interface, and a user input interface (not shown), such as a keyboard and/or touchscreen configured to allow the user to input a search query into a search field displayed on the display 106. System 100 may also include network 108, such as the Internet, configured to communicatively couple device 102 to one or more servers 110, e.g., could-based servers, and/or one or more content databases 112 from which information, e.g., content, relating to the input may be retrieved. Device 102 and the server 110 may be communicatively coupled to one another by way of network 108, and the server 110 may be communicatively coupled to a content database 112 by way of one or more communication paths, such as a proprietary communication path and/or network 108.

In some examples, system 100 may comprise an application that provides guidance through an interface that allows users to efficiently navigate (media) content selections and easily identify (media) content that they may desire. Such guidance is referred to herein as an interactive content guidance application or, sometimes, a content guidance application, a media guidance application, or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate amid and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the examples discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, Random Access Memory (RAM), etc.

With the ever-improving capabilities of the Internet, mobile computing, and high-speed wireless networks, users are accessing media on user equipment devices on which they traditionally did not. As referred to herein, the phrases "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smartphone, or any other television equipment, computing equipment, or wireless device, and/or combination of the same. In some examples, the user equipment device may have a front-facing screen and a rear-facing screen, multiple front screens, or multiple angled screens. In some examples, the user equipment device may have a front-facing camera and/or a rear-facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available through both a television and one or more of the other types of user equipment devices. The media guidance applications may be provided as online applications (i.e., provided on a website), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critics' ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
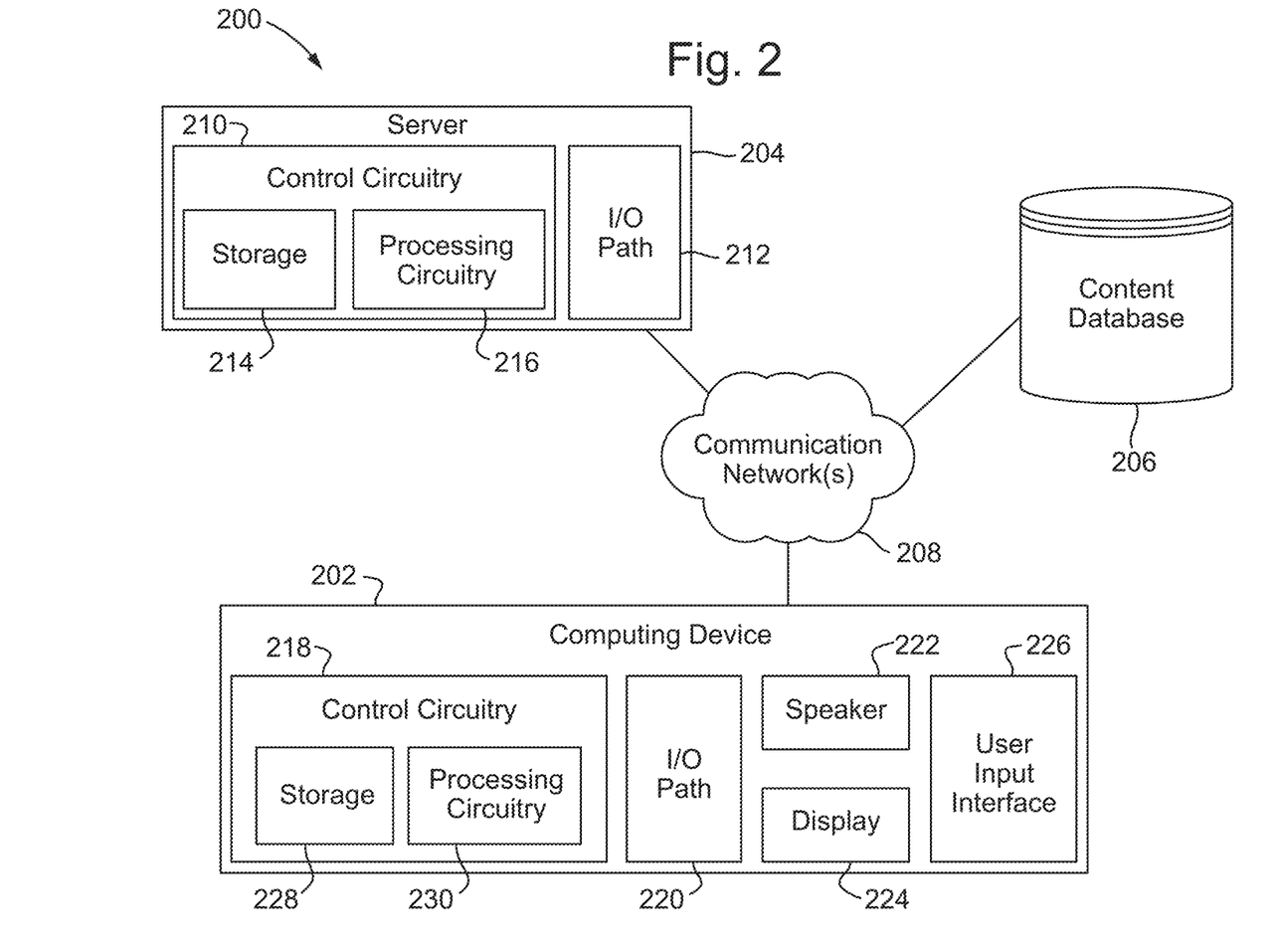
FIG. 2 is a block diagram showing components of an exemplary system for determining whether a voice input signal is a mimicked voice input signal, in accordance with some examples of the disclosure.

FIG. 2 is an illustrative block diagram showing additional details of an example of system 200 for providing search results based on the proximity and/or relationship between one or more users, in accordance with some examples of the disclosure. Although FIG. 2 shows system 200 as including a number and configuration of individual components, in some examples, any number of the components of system 200 may be combined and/or integrated as one device, e.g., user device 100. System 200 includes computing device 202, server 204, and content database 206, each of which is communicatively coupled to communication network 208, which may be the Internet or any other suitable network or group of networks. In some examples, system 200 excludes server 204, and functionality that would otherwise be implemented by server 204 is instead implemented by other components of system 200, such as computing device 202. In still other examples, server 204 works in conjunction with computing device 202 to implement certain functionality described herein in a distributed or cooperative manner.

Server 204 includes control circuitry 210 and input/output (hereinafter "I/O") path 212, and control circuitry 210 includes storage 214 and processing circuitry 216, e.g., natural language processing circuitry. Computing device 202, which may be a personal computer, a laptop computer, a tablet computer, a smartphone, a smart television, a smart speaker, or any other type of computing device, includes control circuitry 218, I/O path 220, speaker 222, display 224, e.g., touchscreen 102, and user input interface 226 which in some examples includes at least one of voice-user interface 106, e.g., a microphone, configured to receive natural language queries uttered by users in proximity to computing device 202; and a touch/gesture interface configured to receive a touch/gesture input, e.g., a swipe. Control circuitry 218 includes storage 228 and processing circuitry 230. Control circuitry 210 and/or 218 may be based on any suitable processing circuitry such as processing circuitry 216 and/or 230. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Control circuitry 210 and/or 218 may comprise audio conversion circuitry, natural language processing circuitry, or any other circuitry for interpreting voice input, and may implement a local speech-to-text model. The local speech-to-text model may be a neural network model or machine learning model. Control circuitry 210 and/or 218 may additionally or alternatively comprise circuitry for receiving and interpreting text input, such as for receiving keyboard commands. The text input may be in the form of a signal from a physical keyboard or a keyboard displayed on a screen. The input may also comprise user drawing symbols that are recognized by the computing device.

Each of storage 214, storage 228, and/or storages of other components of system 200 (e.g., storages of content database 206, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 214, storage 228, and/or storages of other components of system 200 may be used to store various types of content, metadata, and or other types of data. Non-volatile memory may also be used (e.g., to launch a boot-up routine and other instructions). Cloud-based storage may be used to supplement storages 214, 228 or instead of storages 214, 228. In some examples, control circuitry 210 and/or 218 executes instructions for an application stored in memory (e.g., storage 214 and/or 228). Specifically, control circuitry 214 and/or 228 may be instructed by the application to perform the functions discussed herein. In some implementations, any action performed by control circuitry 214 and/or 228 may be based on instructions received from the application. For example, the application may be implemented as software or a set of executable instructions that may be stored in storage 214 and/or 228 and executed by control circuitry 214 and/or 228. In some examples, the application may be a client/server application where only a client application resides on computing device 202, and a server application resides on server 204.

The application may be implemented using any suitable architecture. For example, it may be a stand-alone application wholly implemented on computing device 202. In such an approach, instructions for the application are stored locally (e.g., in storage 228), and data for use by the application is downloaded on a periodic basis (e.g., from an out-of-band feed, from an Internet resource, or using another suitable approach). Control circuitry 218 may retrieve instructions for the application from storage 228 and process the instructions to perform the functionality described herein. Based on the processed instructions, control circuitry 218 may determine what action to perform when input is received from user input interface 226.

In client/server-based examples, control circuitry 218 may include communication circuitry suitable for communicating with an application server (e.g., server 204) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 208). In another example of a client/server-based application, control circuitry 218 runs a web browser that interprets web pages provided by a remote server (e.g., server 204). For example, the remote server may store the instructions for the application in a storage device. The remote server may process the stored instructions using circuitry (e.g., control circuitry 210) and/or generate displays. Computing device 202 may receive the displays generated by the remote server and may display the content of the displays locally via display 224. This way, the processing of the instructions is performed remotely (e.g., by server 204) while the resulting displays, such as the display windows described elsewhere herein, are provided locally on computing device 202. Computing device 202 may receive inputs from the user via input interface 226 and transmit those inputs to the remote server for processing and generating the corresponding displays.

A user may send instructions, e.g., by virtue of a voice input. to control circuitry 210 and/or 218 using user input interface 226. User input interface 226 may be any suitable user interface, such as a remote control, trackball, keypad, keyboard, touchscreen, touchpad, stylus input, joystick, voice recognition interface, gaming controller, or other user input interfaces. User input interface 226 may be integrated with or combined with display 224, which may be a monitor, a television, a liquid crystal display (LCD), an electronic ink display, or any other equipment suitable for displaying visual images.

Server 204 and computing device 202 may transmit and receive content and data via I/O path 212 and 220, respectively. For instance, I/O path 212 and/or I/O path 220 may include a communication port(s) configured to transmit and/or receive (for instance to and/or from content database 206), via communication network 208, content item identifiers, content metadata, natural language queries, and/or other data. Control circuitry 210, 218 may be used to send and receive commands, requests, and other suitable data using I/O paths 212, 220.

Figure 3:
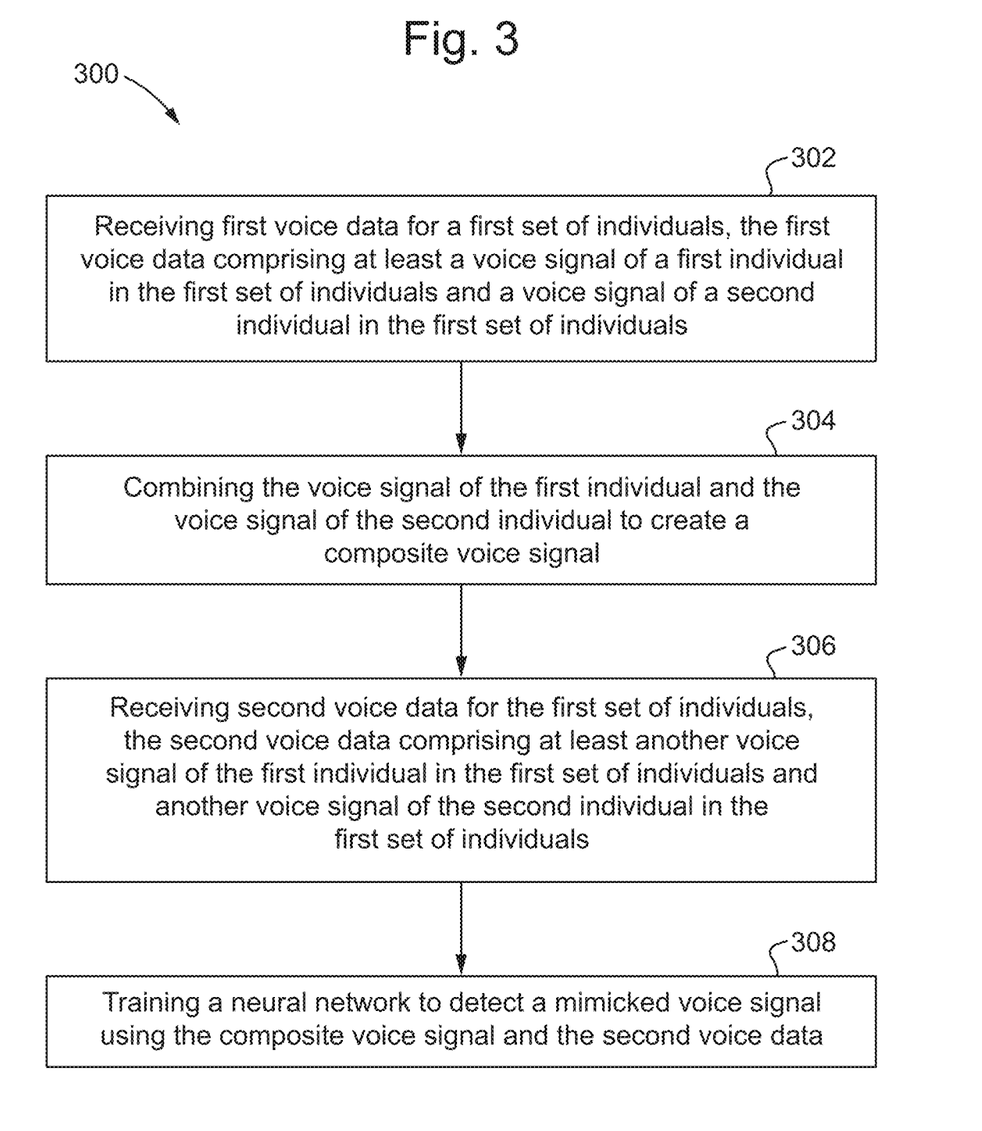
FIG. 3 is a flowchart representing a process for training a neural network to detect a mimicked voice signal, in accordance with some examples of the disclosure.

FIG. 3 is a flowchart representing an illustrative process 300 for training a neural network to detect mimicked voice input. Whilst the example shown in FIG. 3 refers to the use of system 100, as shown in FIG. 1, it will be appreciated that the illustrative process shown in FIG. 3, and any of the other following illustrative processes, may be implemented on system 100 and system 200, either alone or in combination, or on any other appropriately configured system architecture. FIG. 1 shows exemplary system 100 in which multiple users interact with computing device 102, such as voice-activated user equipment. Voice data 114 is received at a computing device 102. At 104, the voice data 114 is converted at the computing device 102 into a format that the computing device 102 can process. For example, the computing device 102 may comprise a microphone that converts raw audio data, which may represent one or more voice input signals, to a digital audio signal and the computing device 102 may use voice recognition software to convert the voice data into a format that the computing device 102 can process. In another example, the voice data may be received by a voice-user interface that is separate from and communicatively coupled to computing device 102. For example, the voice data may be received by a voice-user interface of a mobile computing device of a user, e.g., a smart phone. In such an example, processing of the voice data may be performed on the mobile computing device and later transmitted to computing device 102. Additionally or alternatively, raw voice data may be transmitted from the mobile computing device to the computing device 102, e.g., via network 108.

As referred to herein, the terms "voice data", "voice input" and "voice input signal" refer to any spoken input from a user to a computing device, such as voice-activated user equipment. The voice data may comprise a command and/or query, by which the user expects the computing device to perform a certain action, such as "Play the most recent Tom Cruise movies", or to which the user expects the computing device to provide an answer, such as "How old is Tom Cruise?".

Referring back to FIG. 3, at step 302, first voice data 114 for a first set of individuals 116 is received at voice-user interface 104. The first voice data 114 comprises a voice signal 118 of a first individual 120 in the first set of individuals 116 and a voice signal 122 of a second individual 124 in the first set of individuals 116. However, the first voice data 114 may comprise voice signals from any appropriate number of individuals. Voice signals 118, 122 may be labelled as Class A voice data, indicating that it is representative of an original utterance of a user.

The first individual 120 may be a first member of a first household, e.g., a parent, and the second individual 124 may be a second member of the first household, e.g., a child. In other examples, the first individual 120 may be a member of a first household and the second individual 124 may be a member of a second (e.g., different) household. In some examples, the first individual 120 and the second individual 124 may be members of a household in which the computing device 102 is located. However, in other examples, at least one of the first individual 120 and the second individual 124 may be members of a household different to the household in which the computing device 102, or at least voice-user interface 104, is located.

At step 304, the voice signal 118 of the first individual 120 and the voice signal 122 of the second individual 124 are combined to create one or more composite voice signals. Such a composite voice signal(s) may be labelled as Class B voice data, indicating that it is not representative of an original utterance by any user. The voice signals 118, 122 may be combined in any appropriate manner that results in one or more composite voice signals each containing at least a portion of each of the voice signals 118, 122. For example, the voice signals 118, 122 may be combined using a superimposition operation. Upon combination of the voice signals 118, 122, the resultant composite voice signal will sound different to each of the voice signals 118, 122. In this manner, a new (artificial) voice signal is created, which can be used when training a neural network, e.g., as an example of a voice signal that does not represent an original utterance by a user of a household.

At step 306, second voice data 126 for the first set of individuals 116 is received by computing device 102. The second voice data 126 comprises at least another voice signal 128 of the first individual 120 and another voice signal 130 of the second individual 124. However, the second voice data 114 may comprise voice signals from any appropriate number of individuals. Voice signals 128, 130 may be labelled as Class A voice data, indicating that it is representative of an original utterance of a user. In some examples, the Class A voice data received at step 302 may be combined with the Class A data received at step 306.

At step 308, the second voice data 126 and the one or more composite voice signals are used to train a neural network to determine whether a voice input signal is a mimicked voice input signal. For example, the neural network may be trained by comparing Class A data, which is representative of an original utterance of a user, to Class B data, which is not representative of an original utterance of any user. In some examples, the neural network may be trained by comparing Class A data to Class B data in an 80:20 ratio. In this manner, the neural network is trained to be capable of distinguishing between an original utterance of a first user, such as a parent, and an utterance of a second user, such as a child, attempting to impersonate the first user.

The actions or descriptions of FIG. 3 may be used with any other example of this disclosure, e.g., the example described below in relation to FIG. 4. In addition, the actions and descriptions described in relation to FIG. 3 may be done in any suitable alternative orders or in parallel to further the purposes of this disclosure.

Figure 4:
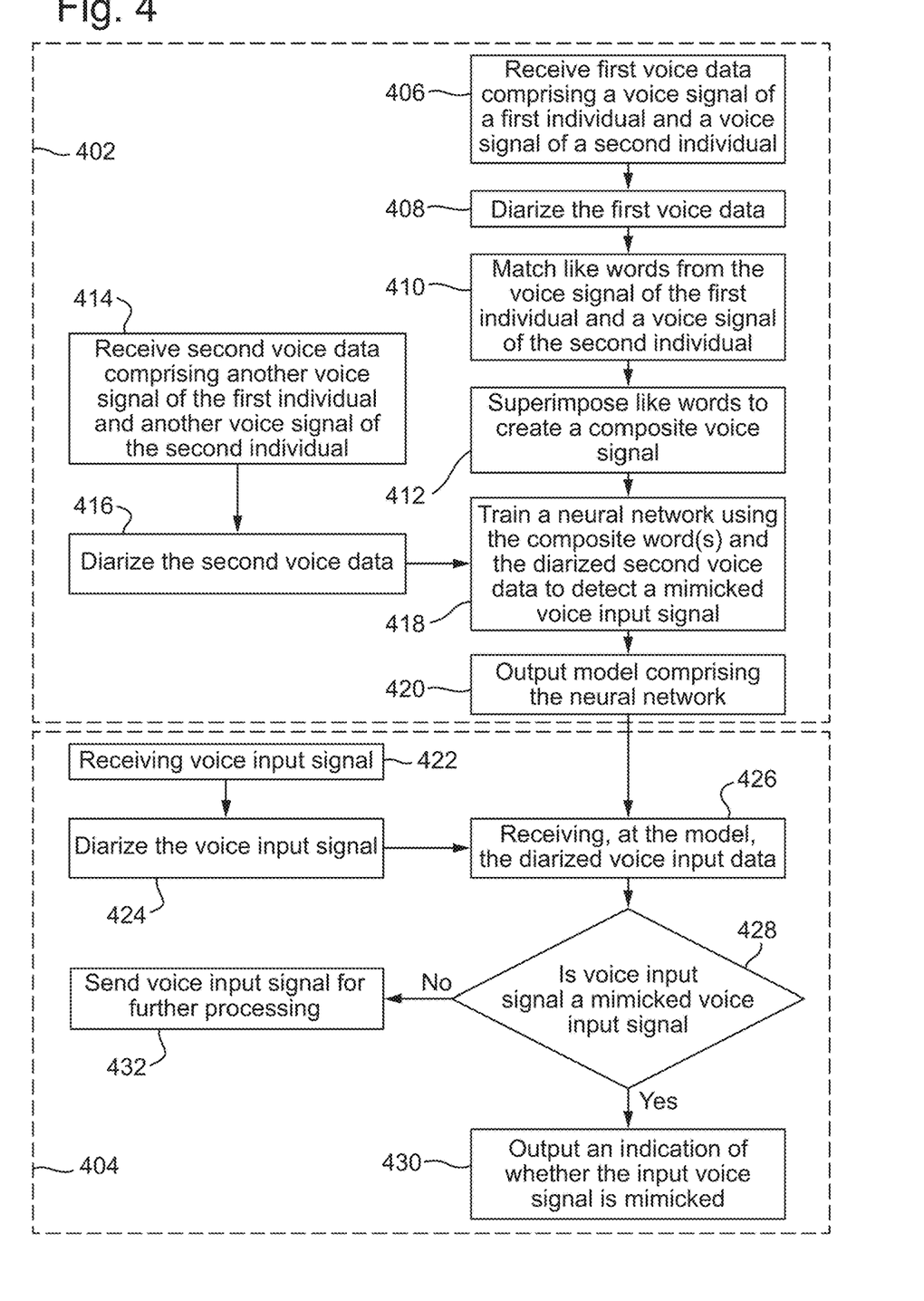
FIG. 4 is a flowchart representing a process for indicating whether an input voice signal is a mimicked voice input signal, in accordance with some examples of the disclosure.

FIG. 4 is a flowchart representing an illustrative process 400 for determining whether a voice input signal is a mimicked voice signal. Whilst the example shown in FIG. 4 refers to the use of system 100 and system 200, as shown in FIGS. 1 and 2, it will be appreciated that the illustrative process shown in FIG. 4, and any of the other following illustrative processes, may be implemented on system 100 and system 200, either alone or in combination, or on any other appropriately configured system architecture.

Process 400 comprises a first sub-process 402 and a second sub-process 404. The first sub-process 402 comprises steps 406 to 420, which set out exemplary steps for training a network to detect mimicked voice input. The second sub-process 404 comprises steps 422 to 432, which set out exemplary steps for determining whether a voice input signal is a mimicked voice signal, e.g., using the trained network of sub-process 402 and/or any other appropriately trained network.

At step 406, first voice data 114, comprising voice signal 118 of the first individual 120 and voice signal 122 of the second individual 124, is received, e.g., at computing device 102, 202. Once received, the voice signals 118, 122 are processed using natural language processing, e.g., using processing circuitry 216, 230. The voice signals 118, 122 may be any appropriate type of utterances by the first and second individuals 120, 124. For example, voice signal 118 may comprise a command, such as, "Play the latest Tom Cruise movie", and voice signal 122 may comprise a query, such as, "What is the latest Tom Cruise movie?". The differences between the content and/or the syntax of the voice signals 118, 122 may be due to the personal preferences of each of the first and second individuals 120, 124. In other examples, the first voice data 114 may comprise, additionally or alternatively, one or more other voice signals, e.g., one or more voice signals from at least one of the first and second individuals 120, 124, and/or one or more voice signals from at least one other individual. In some examples, it may be preferable that all the voice signals are generated by individuals from the same household. However, in other examples, it may be preferable that at least one of the received voice signals is generated by an individual from a household different to at least one of the first and second individuals 120, 124.

At step 408, processing circuitry 216, 230 diarizes the first voice data. For example, the first voice signal 118 may be diarized into the constituent words of the query "Play the latest Tom Cruise movie?", e.g., into the words "Play", "the", and so on. In a similar manner, the second voice signal 122 may be diarized into the constituent words of the command "What is the latest Tom Cruise movie?", e.g., into the words "What", "is", and so on. Additionally or alternatively, voice signals 118, 122 may be diarized into compound words and/or phrases. For example, the first voice signal 118 may be diarized into the words "Play", "the", "latest" and "movie", and the phrase "Tom Cruise". The diarized words may be stored on at least one of storage 214, 228. Diarized first voice data may be labelled as Class A data, since it is representative of an original, e.g., unmodified, utterance of a user.

At step 410, like words and/or phrases of the voice signals 118, 122 are matched, e.g., using processing circuitry 216, 230. For example, the word "the" of the first voice signal 118 is matched to the word "the" of the second voice signal 122, and the phrase "Tom Cruise" of the first voice signal 118 is matched to the phrase "Tom Cruise" of the second voice signal 122. The match words/phrases may be stored on at least one of storage 214, 228. In some examples, the matching of the words and/or phrases may comprise a step of adjusting one or more characteristics of the voice signal. For example, step 410 may comprise adjusting the tempo of at least one of the diarized words/phrases, so that like words/phrases between the voice signals 118, 122 have the same or approximately similar tempos. In examples, where the first voice data comprises voice signals from three or more individuals, like words from each of the three or more individuals may be matched by computing the cartesian product of the voice signals from three or more individuals. For example, where each of the individual's voice signals comprises the phrase "Tom Cruise", the phrase "Tom Cruise" from the first individual's voice signal may be match with the phrase "Tom Cruise" from the second individual's voice signal, and the phrase "Tom Cruise" from the third individual's voice signal, and so on, depending on the number of voice signals from different individuals.

At step 412, the like words/phrases in each matched pair are superimposed, e.g., using processing circuitry 216, 230, to create a composite word/phrase. For example, the word "the" of the first voice signal 118 is superimposed onto to the word "the" of the second voice signal 122, to create a composite voice signal of the word "the" that is different to any utterance of the word "the" by any of the individuals. Composite voice data, e.g., composite word(s)/phrase(s), may be labelled as Class B data, since it is not representative of an original, e.g., unmodified, utterance of a user. In some examples, process 400 may comprise a smoothing and/or averaging operation, e.g., using a band pass filter and/or any other appropriate technique, to smoothen the composite voice data. In some examples, process 400 may comprise combining the composite voice data with one or more reference signals, such as a refence word/phrase signal and/or added noise.

At step 414, second voice data 126, comprising voice signal 128 of the first individual 120 and voice signal 130 of the second individual 124, is received, e.g., at computing device 102, 202. Once received, the voice signals 126, 130 are processed using natural language processing, e.g., using processing circuitry 216, 230. The voice signals 128, 130 may be any appropriate type of utterances by the first and second individuals 120, 124, in a similar manner to the voice signals 118, 122 of the first voice data 114. The second voice 126 may be received at any time, e.g., at a time before and/or after the first voice data 114 is received. In some examples, the first voice data 114 may be a subset of the second voice data 126.

At step 416, the second voice data 126 is diarized in a similar manner to the first voice data 114, as described above. Diarized second voice data may be labelled as Class A data, since it is representative of an original, e.g., unmodified, utterance of a user.

At step 418, a neural network is trained to detect a mimicked voice input signal using the composite word(s) and/or phrase(s) and the diarized second voice data. For example, the training of the neural network may comprise use of a classification algorithm, which may be capable of training the network based on the Class A and Class B data labels. The classification algorithm may be any appropriate algorithm, such as K-means (classes=2), decision trees, and support vector machines. In some examples, the model is trained using Class A and Class B data in the ratio 80:20, although any other appropriate ratio, may be used.

At step 420, a model comprising the trained neural network is output. The model may be stored on storage 214, 228, so that it can be used, e.g., at a later time, to determine whether a voice input signal is a mimicked voice signal. In some examples, the model may be shared among different households.

At step 422, voice input data 132, comprising voice input signal 134 of the second individual 124, is received, e.g., at computing device 102, 202. Once received, the voice signal 134 is processed using natural language processing, e.g., using processing circuitry 216, 230. The voice signal 134 may be any appropriate type of utterances by the second individuals 124, in a similar manner to the above described voice signals. Whilst the example in FIG. 1 depicts voice input data 132 being spoken by the second individual 124, in other examples, voice input data 132 may be spoken by any appropriate individual. In some cases, an individual may try to vocally impersonate another individual, so that they can gain access to content that would otherwise be restricted in their own profile. For example, the second individual 124, e.g., a child, may try to impersonate the first individual 120, e.g., a parent, so that they can bypass parental controls implemented on the child's profile. In some cases, the child may be able to generally impersonate the parent. However, it is unlikely that each word of an impersonated utterance will be wholly accurate. For example, a child may be able to match, e.g., by tone and/or tempo, the parent's manner of speaking the words "Play", "the", "latest" and "movie". However, the child may not be able to quite match the manner in which the parent speaks the phrase "Tom Cruise".

At step 424, the voice input data 132 is diarized in a similar manner to the first and second voice data 114, 126, as described above.

At step 426, the diarized voice input data is received at the model.

At step 428, the model is used to estimate the probability of whether each of the diarized words of the voice signal 134 is either Class A or Class B data. For example, where the child is able to accurately impersonate the manner in which the parent speaks the words "Play", "the", "latest" and "movie", each of those word may be determined to be Class A data. However, where the child is not be able to match the manner in which the parent speaks the phrase "Tom Cruise", the phrase may be determined to be Class B data. The input voice signal 134 may be determined to be a mimicked voice signal if one or more words and/or phases of the input voice signal are determined to be Class B data. In some example, a threshold may be set whereby a predetermined number or percentage of words/phrases in the voice signal 134 must be determined to be Class B data before an indication is given as to whether the voice signal 134 is a mimicked voice signal. For example, the input voice signal 134 may be determined to be a mimicked voice signal if 20 percent or more words and/or phases of the input voice signal are determined to be Class B data. Where the model determines that the voice input signal 134 includes a mimicked voice signal, process 400 continues to step 430. Where the model determines that the voice input signal 134 does not include a mimicked voice signal, process 400 continues to step 432.

At step 430, an indication that the input voice signal is mimicked is output, e.g., using processing circuitry 216, 230. In the example shown in FIG. 1, the indication comprises a text output 136 displayed on display 106. However, the indication may be output in any appropriate manner. For example, the indication may be delivered to a device, such as a smart phone, that is separate from computing device 102. In such an example, a parent may be notified that another individual is trying to access restricted content by impersonating their voice. Process 400 may comprise a step of deactivating, or limiting the operation of, computing device 102 in response to determining that the input voice signal is mimicked. For example, where a parent receives a notification that another individual, such as a child, is trying to access restricted content by impersonating their voice, the parent may send a signal from their smart phone to deactivate, or limit the operation of, computing device 102.

At step 432, the input voice signal 134 is output for further processing. For example, where it is determined that the input voice signal does not comprise a mimicked voice signal, processing circuitry 216, 230 may cause a response 138 to the input voice signal 134 to be displayed on display 106 of computing device 102, and/or any other appropriate device. In some examples, the response may, additionally or alternatively, be an audio response.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for training a network to detect mimicked voice input, the method comprising:
   receiving first voice data comprising at least a first voice signal of a first individual and a second voice signal of a second individual;
   diarizing the first voice data into constituent words of the first voice signal and the second voice signal, wherein each constituent word comprises an individual word;
   combining the first voice signal of the first individual and the second voice signal of the second individual by:
      matching constituent words of the first individual in the first voice data with identical constituent words of the second individual in the first voice data; and
      superimposing each matched pair of constituent words to create a composite voice signal comprising superimposed word pairs;
   labelling the composite voice signal as class B data representing a modified utterance;
   receiving second voice data comprising at least a third voice signal of the first individual;
   diarizing the second voice data into constituent words of the third voice signal;
   labelling the diarized second voice data as class A data representing an unmodified utterance; and
   training the network based on the class A and class B data to determine whether a voice input signal is a mimicked voice input signal based on;
      identifying a number of constituent words diarized from the voice input signal as class B data based on matching constituent words diarized from the voice input signal with constituent words of the class B data that are (a) identical constituent words and (b) have at least one of a same tone or tempo; and
      determining a percentage of the constituent words diarized from the voice input signal identified as class B data, wherein the percentage is based on comparing the number of the constituent words diarized from the voice input signal identified as class B data to a total number of the constituent words diarized from the voice input signal.

2. The method according to claim 1, the method comprising computing a cartesian product of the voice signals of the first voice data.

3. The method according to claim 1, wherein the first individual and the second individual are from a first household.

4. The method according to claim 1, wherein the first individual is from a first household and the second individual is from a second household.

5. The method according to claim 1, the method comprising combining at least one of the voice signal of the first individual or the voice signal of the second individual with a reference voice signal.

6. The method according to claim 1, wherein the percentage is at least 20%.

7. The method according to claim 1, wherein matching constituent words of the first individual in the first voice data with identical constituent words of the second individual in the first voice data further comprises:

matching each instance of a particular word in the constituent words of the first individual in the first voice data with each instance of the same particular word in the constituent words of the second individual in the first voice data.

8. The method according to claim 1, wherein matching constituent words of the first individual in the first voice data with identical constituent words of the second individual in the first voice data further comprises:
adjusting a tempo of at least one of the voice signal of the first individual or the voice signal of the second individual; and
matching constituent words of the first individual in the first voice data with constituent words of the second individual in the first voice data having the same duration.

9. The method according to claim 1, wherein matching constituent words of the first individual in the first voice data with identical constituent words of the second individual in the first voice data further comprises:
performing a phase shift operation on at least one of the voice signal of the first individual or the voice signal of the second individual; and
matching constituent words of the first individual in the first voice data with constituent words of the second individual in the first voice data having at least one of the same start point or the same end point.

10. The method according to claim 1, wherein matching constituent words of the first individual in the first voice data with identical constituent words of the second individual in the first voice data further comprises:
matching constituent words of the first individual in the first voice data with constituent words of the second individual in the first voice data having the same tone.

11. A system for training a network to detect mimicked voice input, the system comprising control circuitry configured to:
receive first voice data comprising at least a first voice signal of a first individual and a second voice signal of a second individual;
diarize the first voice data into constituent words of the first voice signal and the second voice signal, wherein each constituent word comprises an individual word;
combine the first voice signal of the first individual and the second voice signal of the second individual by:
matching constituent words of the first individual in the first voice data with identical constituent words of the second individual in the first voice data; and
superimposing each matched pair of constituent words to create a composite voice signal comprising superimposed word pairs;
label the composite voice signal as class B data representing a modified utterance;
receive second voice data comprising at least a third voice signal of the first individual;
diarize the second voice data into constituent words of the third voice signal;
label the diarized second voice data as class A data representing an unmodified utterance; and
train the network based on the class A and class B data to determine whether a voice input signal is a mimicked voice input signal based on:
identifying a number of constituent words diarized from the voice input signal as class B data based on matching constituent words diarized from the voice input signal with constituent words of the class B data that are (a) identical constituent words and (b) have at least one of a same tone or tempo; and
determining a percentage of the constituent words diarized from the voice input signal identified as class B data, wherein the percentage is based on comparing a number of the constituent words diarized from the voice input signal identified as class B data to a total number of the constituent words diarized from the voice input signal.

12. The system according to claim 11, wherein the control circuitry is configured to compute a cartesian product of the voice signals of the first voice data.

13. The system according to claim 11, wherein the control circuitry is configured to receive the first voice data from individuals in the same household.

14. The system according to claim 11, wherein the control circuitry is configured to receive the first voice data from individuals from different households.

15. The system according to claim 11, wherein the control circuitry is configured to combine at least one of the voice signal of the first individual and the voice signal of the second individual with a reference voice signal.

16. The system according to claim 11, wherein the percentage is at least 20%.

17. The system according to claim 11, wherein matching constituent words of the first individual in the first voice data with identical constituent words of the second individual in the first voice data further comprises:
matching each instance of a particular word in the constituent words of the first individual in the first voice data with each instance of the same particular word in the constituent words of the second individual in the first voice data.

18. The system according to claim 11, wherein matching constituent words of the first individual in the first voice data with identical constituent words of the second individual in the first voice data further comprises:
adjusting a tempo of at least one of the voice signal of the first individual or the voice signal of the second individual; and
matching constituent words of the first individual in the first voice data with constituent words of the second individual in the first voice data having the same duration.

19. The system according to claim 11, wherein matching constituent words of the first individual in the first voice data with identical constituent words of the second individual in the first voice data further comprises:
performing a phase shift operation on at least one of the voice signal of the first individual or the voice signal of the second individual; and
matching constituent words of the first individual in the first voice data with constituent words of the second individual in the first voice data having at least one of the same start point or the same end point.

20. The system according to claim 11, wherein matching constituent words of the first individual in the first voice data with identical constituent words of the second individual in the first voice data further comprises:
matching constituent words of the first individual in the first voice data with constituent words of the second individual in the first voice data having the same tone.

* * * * *